US008582287B2

United States Patent
Nguyen et al.

(10) Patent No.: US 8,582,287 B2
(45) Date of Patent: Nov. 12, 2013

(54) DRIVE CARRIER WITH PIVOTING HANDLE

(75) Inventors: Minh H. Nguyen, Katy, TX (US); Kelly K. Smith, Spring, TX (US); Kapil Rao Ganta Papa Rao Bala, Houston, TX (US); Alan B. Doerr, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 76 days.

(21) Appl. No.: 13/320,736

(22) PCT Filed: Jun. 19, 2009

(86) PCT No.: PCT/US2009/047894
§ 371 (c)(1),
(2), (4) Date: Nov. 15, 2011

(87) PCT Pub. No.: WO2010/147593
PCT Pub. Date: Dec. 23, 2010

(65) Prior Publication Data
US 2012/0087084 A1 Apr. 12, 2012

(51) Int. Cl.
*H05K 7/00* (2006.01)
*H05K 5/00* (2006.01)
(52) U.S. Cl.
USPC ............ 361/679.37; 361/679.02; 361/679.33; 361/679.34; 211/126.6
(58) Field of Classification Search
USPC ............. 361/679.02, 679.37, 379.33, 679.34; 211/26, 78, 126.6; 720/601
See application file for complete search history.

(56) References Cited

U.S. PATENT DOCUMENTS

| 3,039,837 | A | * | 6/1962 | Poe | 312/332.1 |
| 5,481,431 | A | * | 1/1996 | Siahpolo et al. | 361/679.31 |
| 5,588,728 | A | * | 12/1996 | Eldridge et al. | 312/332.1 |
| 5,641,296 | A | * | 6/1997 | Larabell et al. | 439/342 |
| 5,924,782 | A | * | 7/1999 | Park | 312/328 |
| 6,394,509 | B1 | * | 5/2002 | Kurek, III | 292/199 |
| 6,768,638 | B2 | * | 7/2004 | Shih | 361/679.33 |
| 6,816,367 | B2 | * | 11/2004 | Liu et al. | 361/679.33 |
| 6,891,723 | B1 | * | 5/2005 | Lin et al. | 361/679.33 |
| 7,345,237 | B2 | * | 3/2008 | Chen et al. | 174/50 |
| 7,400,936 | B2 | * | 7/2008 | Chang | 700/90 |
| 7,639,490 | B2 | * | 12/2009 | Qin et al. | 361/679.34 |

(Continued)

FOREIGN PATENT DOCUMENTS

| JP | 06019583 | 1/1994 |
| JP | 2005/322306 | 11/2005 |
| KR | 10-2009-0049694 | 5/2009 |

*Primary Examiner* — Adrian S Wilson
*Assistant Examiner* — Abhishek Rathod

(57) ABSTRACT

A drive carrier comprises a base adapted to receive a drive, two opposing sides extending from the base with each side having first and second stand-off receiving apertures that each receives a stand-off from a surface on which the drive carrier is positioned. The carrier comprises a handle coupled to each side via a hinge. The handle has a stand-off receiving notch associated with each side and each stand-off receiving notch receives one of the stand-offs when the drive carrier is locked in place on the surface. Each notch applies insertion and removal forces against the received stand-off during insertion and removal of the carrier. The hinge defines a plane through the hinges and parallel to the base. The handle pivots downward toward the plane and base to lock the drive carrier to the surface. When the drive carrier is in a locked position, the handle rests above the plane.

10 Claims, 10 Drawing Sheets

(56) References Cited

U.S. PATENT DOCUMENTS

| | | | |
|---|---|---|---|
| 7,755,887 B2 * | 7/2010 | Chen et al. | 361/679.33 |
| 8,050,027 B2 * | 11/2011 | Liang | 361/679.37 |
| 8,243,435 B2 * | 8/2012 | Li | 361/679.37 |
| 8,289,693 B2 * | 10/2012 | Li | 361/679.34 |
| 8,300,398 B2 * | 10/2012 | Zhang et al. | 361/679.33 |
| 2006/0171109 A1 | 8/2006 | Chang | |
| 2006/0171110 A1 | 8/2006 | Li | |
| 2007/0014085 A1 * | 1/2007 | Meserth et al. | 361/685 |
| 2008/0080130 A1 * | 4/2008 | Chen | 361/685 |
| 2008/0089021 A1 * | 4/2008 | Deng et al. | 361/685 |
| 2008/0158810 A1 * | 7/2008 | Liu et al. | 361/685 |
| 2008/0244052 A1 * | 10/2008 | Bradicich et al. | 709/223 |
| 2008/0259554 A1 * | 10/2008 | Qin et al. | 361/685 |
| 2009/0059509 A1 * | 3/2009 | Peng et al. | 361/685 |
| 2011/0289521 A1 * | 11/2011 | Chen | 720/601 |

* cited by examiner

DRIVE CARRIER WITH PIVOTING HANDLE

BACKGROUND

Many types of electronic systems (e.g., computers) include one or more storage drives (e.g., hard disk drives, etc.). Such storage drives are removable to permit repairs, upgrades, and the like. Some systems have storage drives that are accessible from an external surface of the system such as the front panel. From such a panel, a user can slide the drive out of the system and/or slide a new drive into the system. Positioning the drives so as to be externally replaceable places limitations on the configuration of other components in the system.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an indirect, direct, mechanical, optical, or wireless electrical connection. For example, if a first device couples to a second device, that connection may be through a direct mechanical connection or through an indirect mechanical connection via other devices and connecting structures.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
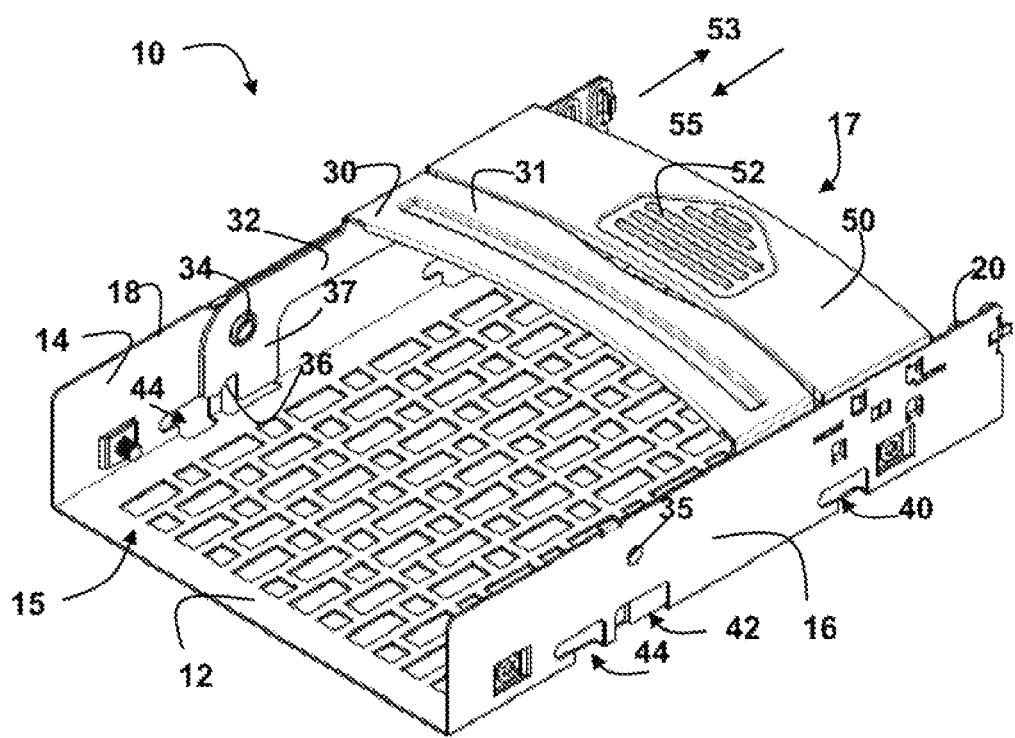
FIG. 1 shows a perspective view of a drive carrier in accordance with various embodiments.

FIG. 1 shows a drive carrier 10 in accordance with various embodiments. In the embodiment shown, the drive carrier 10 comprises a base 12 and a pair of opposing sides 14 and 16 extending upward from the base 12 a generally at a 90 degree angle to the base 12. The carrier 10 also comprises a handle 30 coupled to each side 14, 16 via hinges 34 and 35. The hinges 34, 35 define pivot points about which the handle 30 can be rotated upward and downward relative to the base 12.

Each side comprises a plurality of stand-off receiving apertures 40, 42, and 44. In the embodiment depicted in FIG. 1, each side comprises three stand-off receiving apertures 40-44, but in other embodiments a different number of apertures (e.g., two) can be provided. Each stand-off receiving aperture 40-44 generally comprises a slot that receives a stand-off mounted in a chassis of, for example, a computer system, to enable the drive carrier 10 to slide between unlocked and locked positions so that a storage drive can be inserted into and removed from a computer chassis.

In some embodiments, one of the stand-off receiving apertures 40-44 is positioned closer to one of the other stand-off receiving apertures than another stand-off receiving aperture. For example, aperture 44 is closer to aperture 42 than to aperture 40. By not spacing all three apertures equidistant from each other, the carrier can be installed in a chassis in only one orientation. That is, the extra aperture 44 provides a "key" that prevents improperly installing the carrier 10 and its drive.

The handle 30 is attached to each side 14, 16 generally at or near one of the stand-off receiving apertures. In the example of FIG. 1, the handle 30 is attached to the sides near apertures 42. In at least some embodiments, the handle 30 attaches to each side at a point that is at least 15% of the length of the side from one of the open ends 15, 17 of the carrier.

The handle comprises a lateral member 31 that extends between to side members 32. The side members 32 of the handle are coupled to sides 14, 16 via the hinges 34, 35. Each side member 32 extends from the lateral member 31 and has a termination portion 37 to which the hinge attaches. Each termination portion 37 generally extends at a 90 degree angle to the corresponding side member 32. Further, each termination portion 37 contains a stand-off receiving notch 36.

As will be explained below, during installation, the carrier is lowered into a chassis which contains stand-offs that insert into each side through the stand-off receiving apertures 42 and into the stand-off receiving notches 36 of the handle 30. Stand-offs also insert into one or both of apertures 40 and 44. As the handle is pushed down towards a locked position (FIG. 1 shows the handle in the locked position), the notches 36 push against their corresponding stand-offs thereby forcing the drive carrier 10 to slide forward in direction 53 to a locked position in the chassis. Upon removal, a user pulls up on the handle 30. As a result, the notches 36 push against the opposite sides of the stand-offs forcing the drive carrier 10 to slide in the opposite direction 55 to an unlocked position in which the carrier and storage drive can be removed.

The carrier 10 is a top-loaded carrier meaning that it installs from on top of the chassis downward, rather than sliding through a front or back surface of the chassis. Because the carrier 10 is top-loaded, the carrier needs relatively little space to slide back and forth as compared to front-loaded carriers.

FIG. 1 also shows a locking latch 50. The locking latch 50 of the embodiment of FIG. 1 extends between the sides 14, 16 and slides near or along top edges 18, 20 of the sides 14, 16. The locking latch 50 contains a friction pad 52 (e.g., ridges) that a user can grip to force the latch 50 to slide in directions 53 or 55. Once the handle 30 is lowered into the locked position (shown in FIG. 1), sliding the locking latch 50 in direction 55 causes the locking latch 50 to engage the handle (exemplary detail to be shown FIGS. 10A and 10B) to prevent the handle 30 from being raised. With the handle 30 being retained in place by locking latch 50, the handle cannot be raised. If the handle cannot be raised, the drive carrier 10 cannot be removed.

To unlock and remove the driver carrier, a user slides locking latch 50 in direction 53 to disengage the latch 50 from handle 30. Once the latch 50 is disengaged from the handle 30, the handle can be raised upward thereby causing the drive carrier's handles to push themselves against the stand-offs extending through apertures 42. As a result, the drive carrier 10 slides along direction 53 until the carrier can be removed from the chassis.

Figure 2:
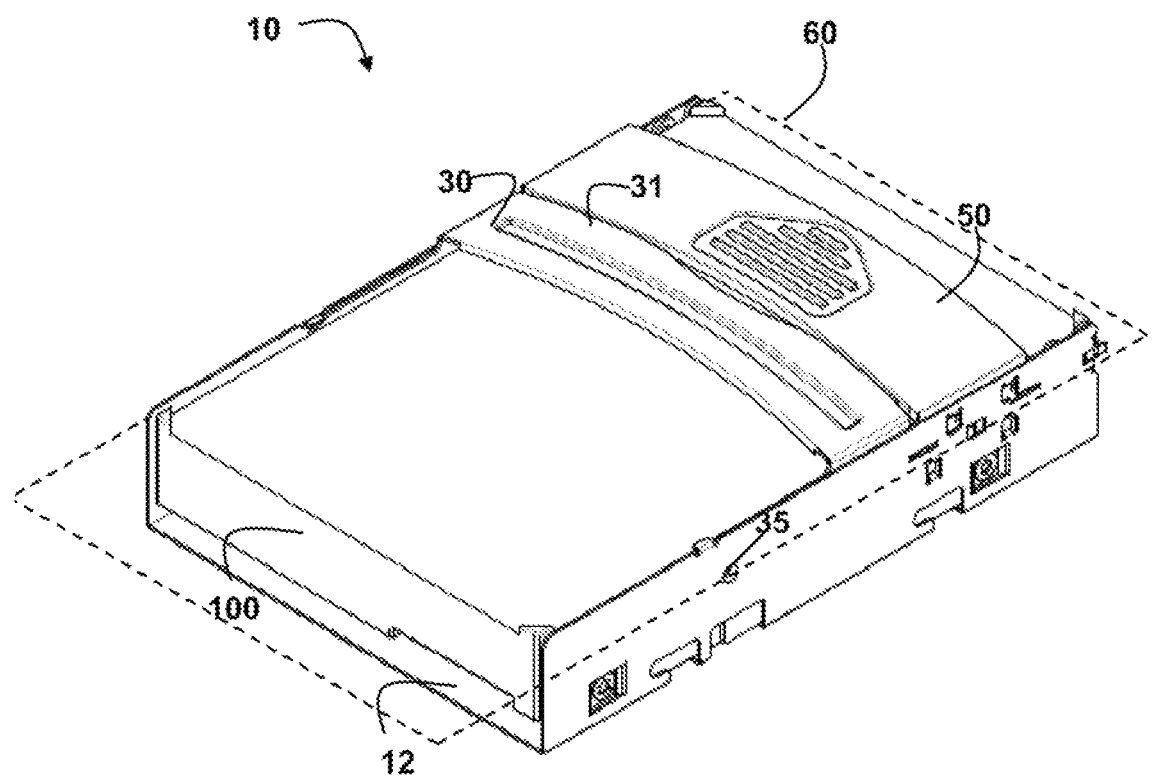
FIG. 2 shows a perspective view of a carrier with a drive in accordance with various embodiments.

FIG. 2 illustrates the drive carrier 10 with a storage drive 100 attached to the carrier 10 (e.g., via screws or other attachment mechanisms). The storage drive (e.g., hard disk drive or other type of storage medium) 100 is mounted on the base 12 of the carrier 10. In dashed line, FIG. 2 also depicts a plane 60. Plane 60 extends through hinges 34 and 35 and is parallel to the base 12. As the handle 30 is raised up from its locked position, the lateral member 31 of the handle pivots upward and away from plane 60. As the handle 30 is pushed downward towards its locked position, the handle's lateral member 31 pivots downward towards plane 60 and base 12 to lock the drive carrier 10 in the chassis. When the drive carrier 12 is in its locked position, the lateral member 31 of the handle 30 rests above the plane 60.

Figure 3:
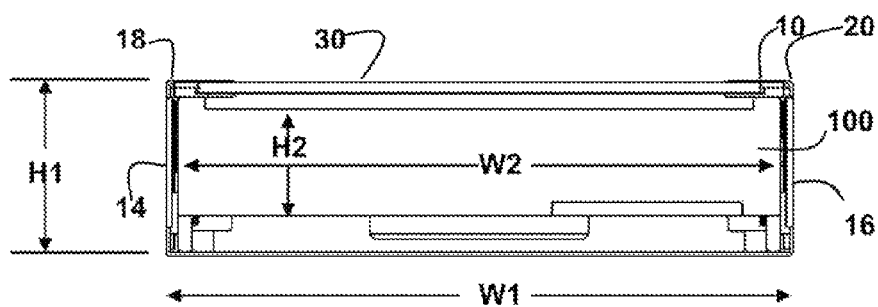
FIG. 3 shows a front view of the drive carrier in accordance with various embodiments.

FIG. 3 shows a front view of the drive carrier 12 with storage drive 100 included therein. As can be seen, the handle 30 rests substantially flush with the top edges 18 and 20 of sides 14 and 16. Further, the drive carrier 10 height H1 is not substantially greater than the height H2 of the drive 100 itself, and the drive carrier width W1 is not substantially greater than the width W2 of the drive. For example, in some embodiments carrier height H1 and width W1 of the carrier 10 are within 99% of the height H2 and width W2 of the drive 100.

Figure 4:
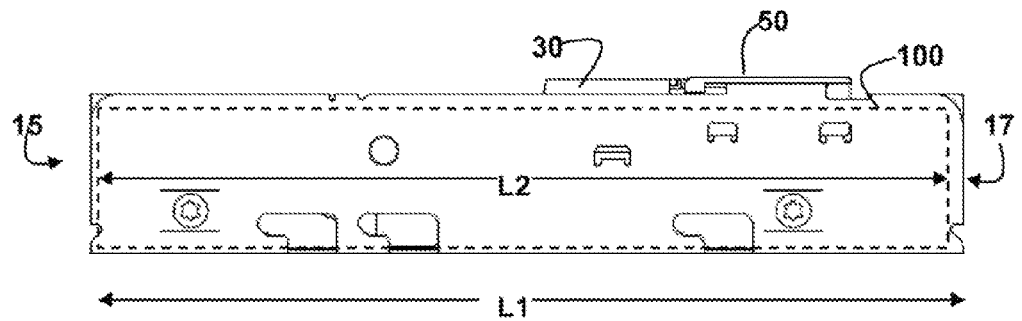
FIG. 4 shows a side view of the drive carrier in accordance with various embodiments.

FIG. 4 shows a side view of the carrier 10 with the drive 100 depicted in dashed outline. The length of the carrier 10 is denoted as L1 and the length of the drive 100 is denoted as L2. Operating the handle 30 from above the carrier 10 (rather than at an end 15 or 17) means that the handle and any supporting structure need not be included at the ends of the carrier and thus the length of the carrier need not be extended to accommodate the handle. Accordingly, the length L1 of the carrier need not be substantially greater than the length L2 of the drive 100 (e.g., within 99%).

Figure 5:
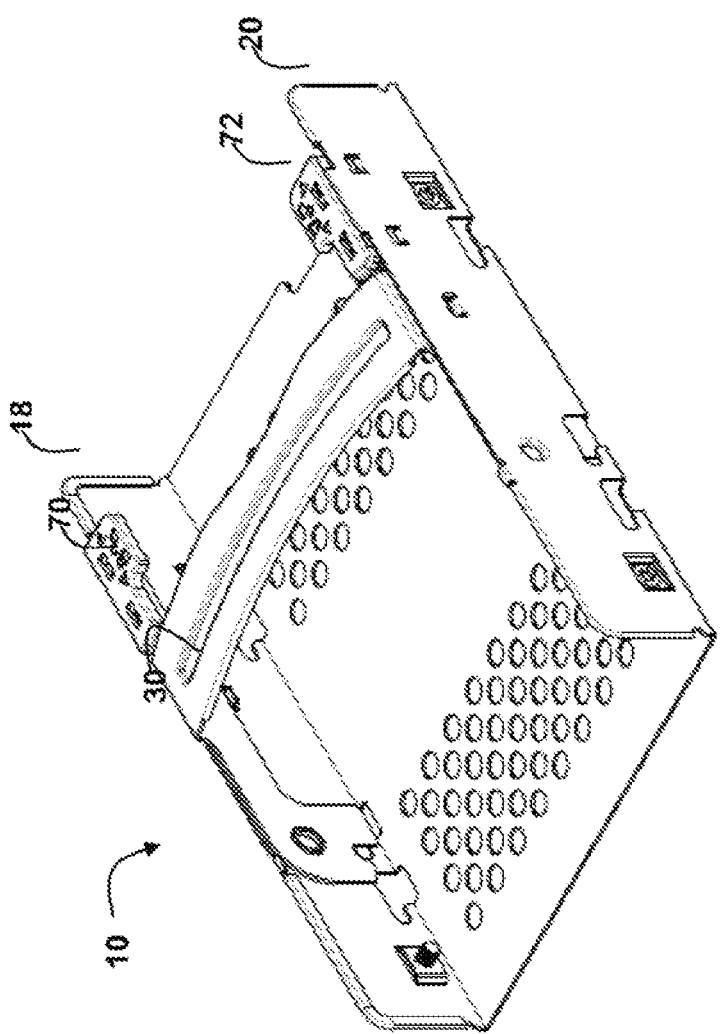
FIG. 5 shows a perspective view of the drive carrier in accordance with an alternate embodiment.

FIG. 5 illustrates another embodiment of carrier 10. A difference between the embodiment shown in FIG. 5 and that of FIG. 1 relates to the locking latch that locks the handle 30 in its locked position. In FIG. 1, the locking latch 50 comprises a member (e.g., a single piece) that extends between the top edges 18 and 20 of the sides 14 and 16. In FIG. 5, however, the locking latch comprises two separate latches 70 and 72. Each latch 70, 72 slides (by operation of a user) along a corresponding top edge 18, 20 and is operated independently of the other latch.

Figure 6:
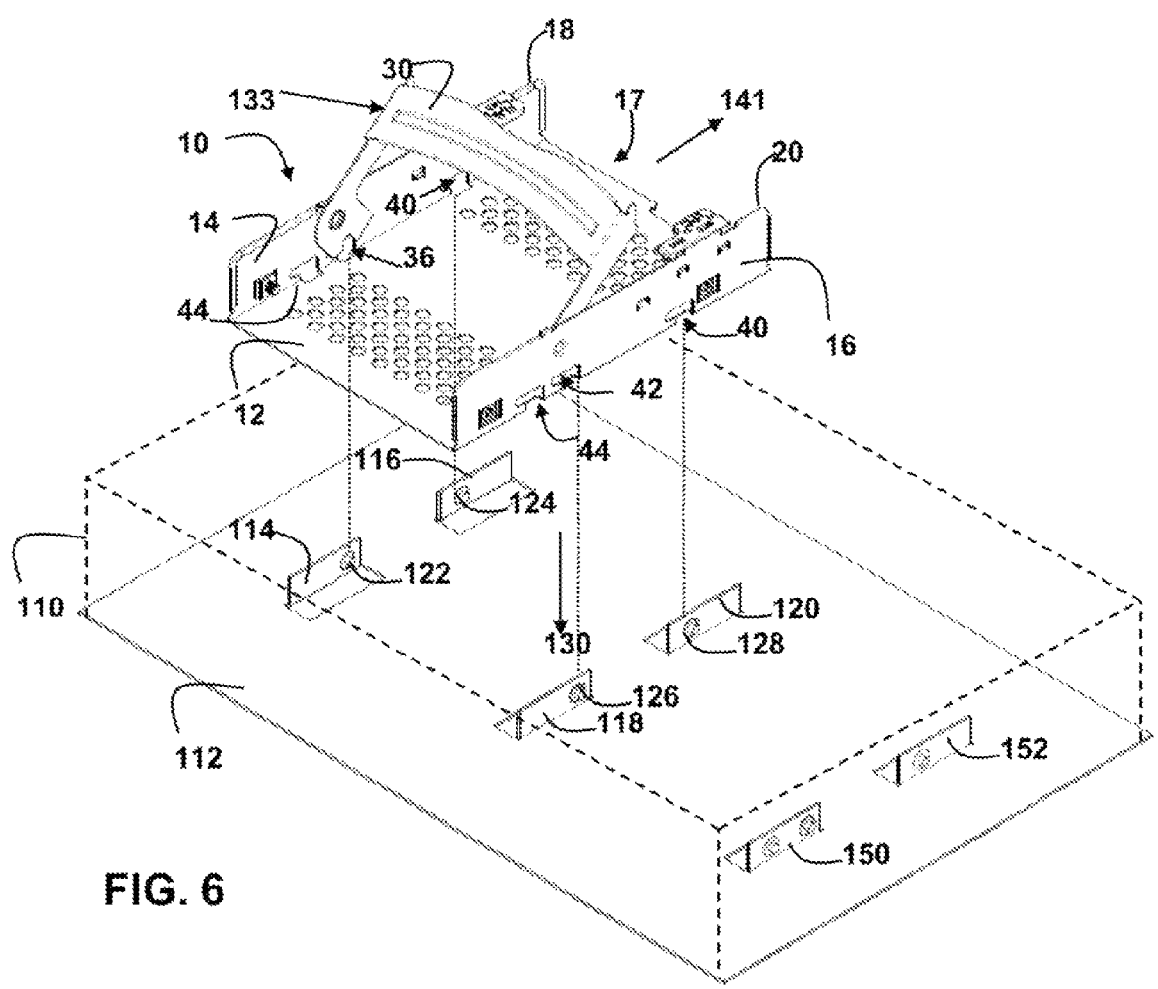
FIG. 6 illustrates how the drive carrier is top-loaded into a computing device in accordance with various embodiments.

FIG. 6 illustrates the installation of the drive carrier 10 (storage drive not shown) in a chassis 110. The chassis 110 comprises any type of a housing for a computer (e.g., server) or other type of system in which a storage drive could be used. The chassis comprises a surface 112 to which the drive carrier 10 is lowered and attached to during installation. In some embodiments, the surface 112 may comprise the bottom surface of the chassis 110, but can be other surfaces within the chassis 110 as desired.

The surface 112 comprises a plurality of stand-offs 114, 116, 118, and 120. In the example of FIG. 6, two stand-offs 114, 116 are provided on the surface 112 and engage one side 14 of the drive carrier 10, and two other stand-offs 118, 120 are provided on the surface 112 to engage the other carrier side 16. Each stand-off 114-120 in FIG. 6 generally includes a rectangular-shaped member extending upward from surface 112 at a generally 90 degree angle. Each such upward extending member comprises a laterally-protruding pin. Stand-offs 114-120 comprise pins 122-128, respectively, as shown. As used herein and unless otherwise indicated, the term "stand-off" includes member that extends up from the surface 112 as well as the pin.

The drive carrier 10 is lowered with the handle 30 in the unlocked, up position as shown. As the drive carrier 10 is lowered along the direction of arrow 130 onto the surface 112, the drive carrier is positioned such that the pins 122-128 from the stand-offs 114-120 enter the stand-off receiving apertures 42 and 40 on both sides of the carrier. With the handle 30 in the up position as shown, the notches 36 in the termination portions of the handle 30 are oriented so as to be able to receive pins 122 and 126 from stand-offs 114 and 118.

Figure 7A:
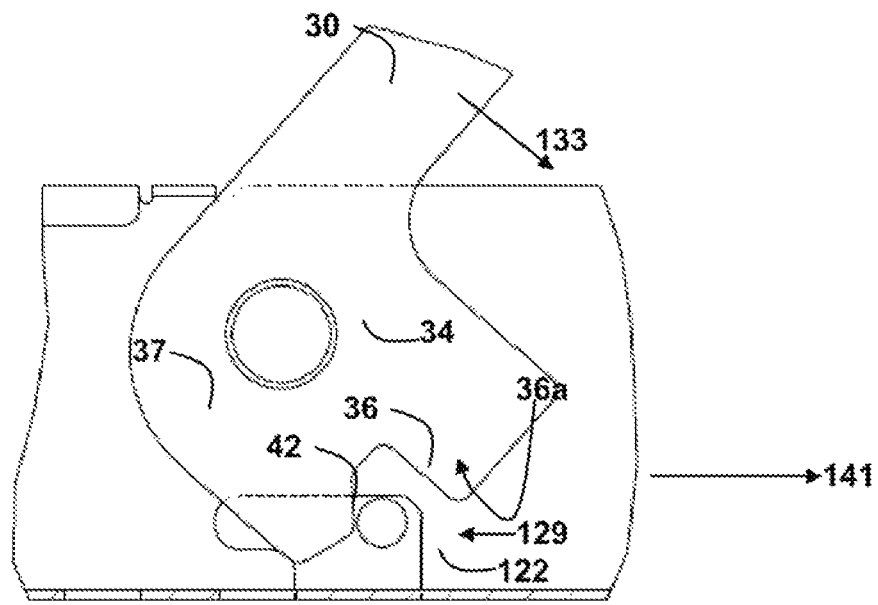
FIGS. 7A and 7B illustrate the interaction between a stand-off pin and a corresponding aperture in accordance with various embodiments.

Each aperture is generally L-shaped having a vertical pin entering portion and a horizontal pin retaining portion. FIG. 7A illustrates stand-off receiving aperture 42 which receives a pin 122 from a stand-off 118 into the pin entering portion 147 of the aperture 42. The pin 122 is received through the pin entering portion 147 and into the aperture 42 initially into position 129. The termination portion 37 of the handle 30 also is shown in relation to the received pin 126. As the handle 30 is lowered into its locked position in the direction of arrow 133, one surface 36a that, in part, defines the notch 36 presses against one side of the pin 122, which is fixed in place, thereby forcing the entire drive carrier 10 to move in the direction of arrow 141. When the handle 30 is fully lowered (FIG. 7B), the pin 122 resides in a pin retaining portion 131 of the aperture 42. The carrier 10 cannot be removed at least in part because the pin 122 is held in place by the pin retaining portion 131 of the aperture.

Figure 7B:
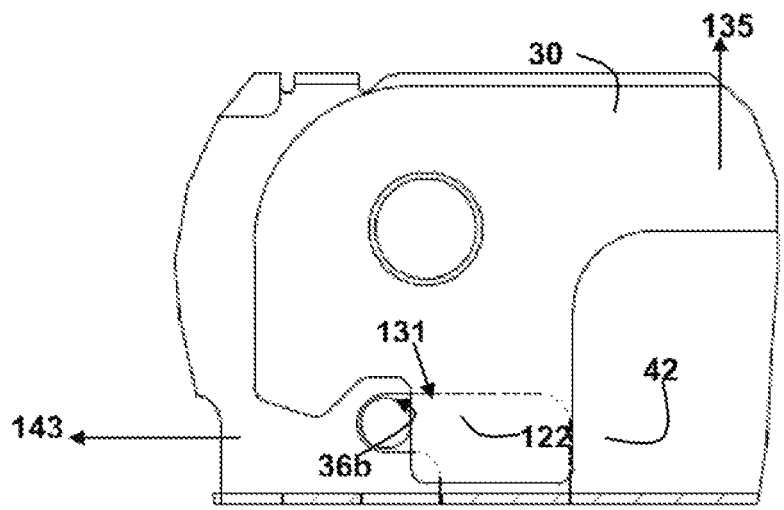

In FIG. 7B, as the handle 30 is raised up in the direction of arrow 135 from the locked position to the unlocked position, the notch's opposing surface 36b (opposite that of surface 36a) presses against the pin's side opposite to that contacted by notch surface 36a during installation. The force exerted by notch surface 36b against the pin 122 causes the carrier 10 to slide in the opposite direction 143 so that the pin again becomes resident at position 129 thereby permitting the carrier to be lifted up and removed from the chassis 110.

Referring again to FIG. 6, the stand-offs 118 and 120 have pins 126 and 128 that extend to both sides of the rectangular shaped members. Another pair of stand-offs 150 and 152 is also shown. This configuration permits two drive carriers 10 to be installed side-by-side in the chassis if desired.

In some embodiments, the storage drive has a blind-mating connector on one end of the drive and thus exposed at end 17 of the carrier 10. Once the carrier 10 is in place on surface 112 and the pins 122-128 from the stand-offs 114-120 are engaged in the stand-off receiving apertures 40 and 42, the handle is pushed downward in the direction of arrow 133 by a user as explained above. The pivoting handle causes the notches 36 to push against pins 122 and 126 thereby to force the carrier 10 to slide in the direction of arrow 141 and force the mating of the storage drive's blind-mating connector to a corresponding connector (not shown) in the chassis.

In the embodiment of FIG. 6, no stand-offs or pins are provided for engaging apertures 44. As such, the drive carrier 10 of the embodiment of FIG. 6 could be installed backwards which would mean that the storage drive's connector would be on the wrong side of the carrier for engaging the corresponding connector.

Figure 8:
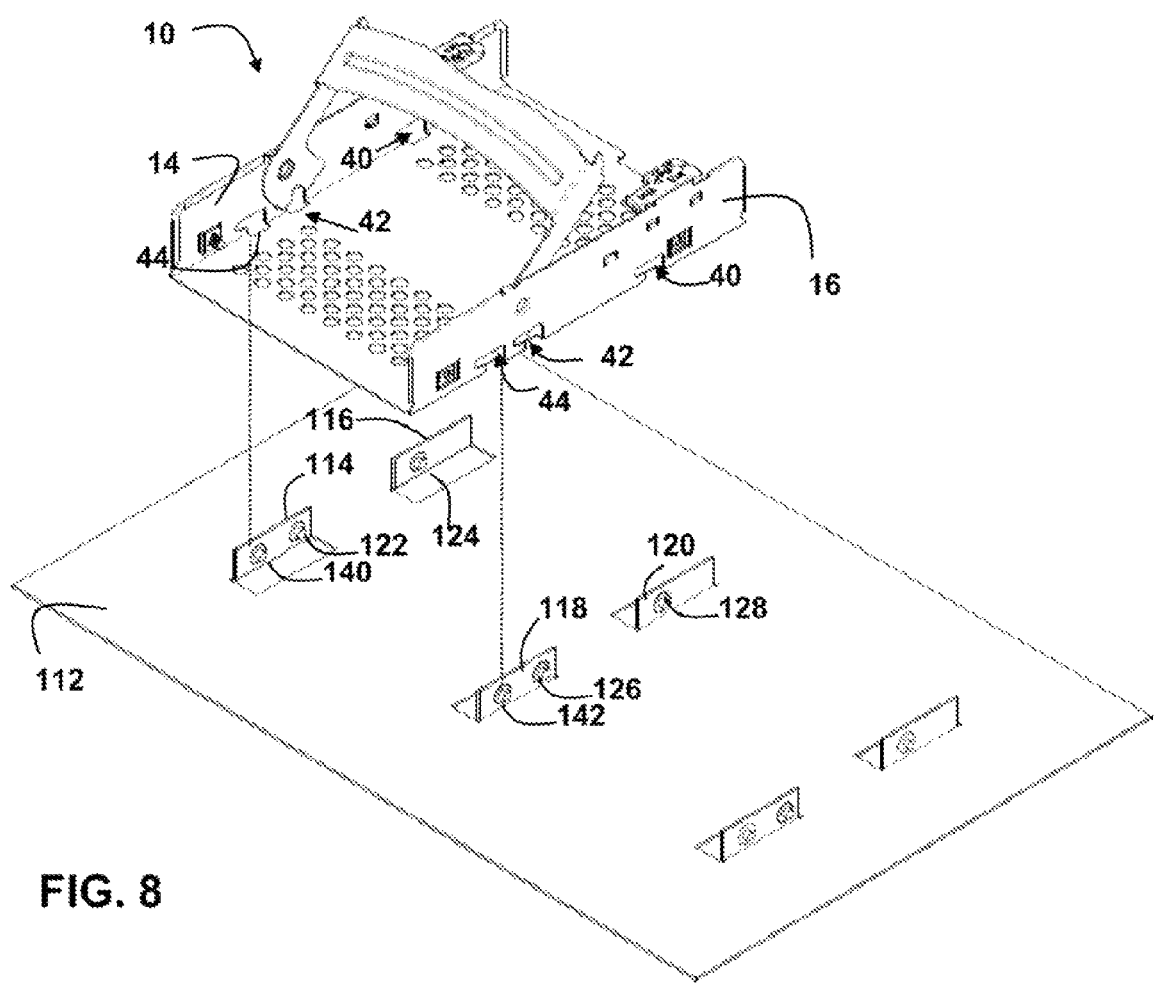
FIG. 8 illustrates the use of a key to prevent incorrect installation of the drive carrier and drive in accordance with various embodiments.

FIG. 8 illustrates an embodiment in which a third pin is provided on a stand-off on each side of the carrier. As shown in the example of FIG. 8, each of stand-offs 114 and 118 have an extra pin 140 and 142, respectively. In other embodiments, separate stand-offs are provided altogether to provide the extra pins 140, 142. Pins 140 and 142 engage stand-off receiving apertures 44 on the sides 14, 16 of the carrier 10. Pins 140 and 142 create an asymmetry of the pins along each side of the carrier 10 (pins 140, 142 are closer to pins 122, 126, respectively, than to pins 124, 128) thereby permitting the carrier 10 to be installed in only one orientation in the chassis.

Figure 9:
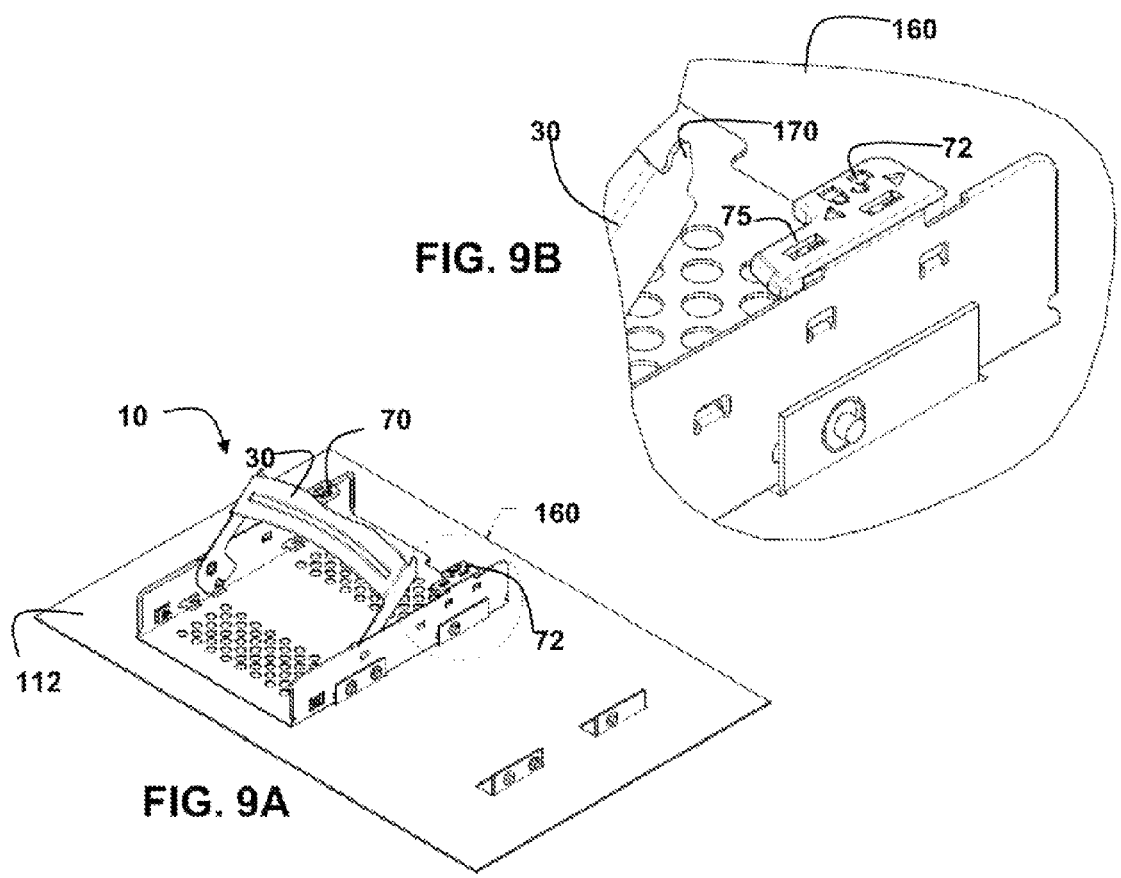
FIGS. 9A and 9B shows the positioning of the drive carrier in a computing system but still in an unlocked position in accordance with various embodiments.

FIG. 9A illustrates a drive carrier 10 positioned on the surface 112 with the handle 30 in the unlocked position. In the embodiment shown, the carrier includes the separate latches 70 and 72 (discussed above regarding FIG. 5). FIG. 9B shows a blown-up portion 160 of FIG. 9A illustrating the interaction between one of the latches 72 and the handle 30. The handle 30 includes a tip portion 170 adapted to engage into a receiving portion 75 of latch 72. FIGS. 9A and 9B show the drive carrier 10 with the handle 30 still in the unlocked position. A similar structure is provided for the other side of the handle.

Figure 10:
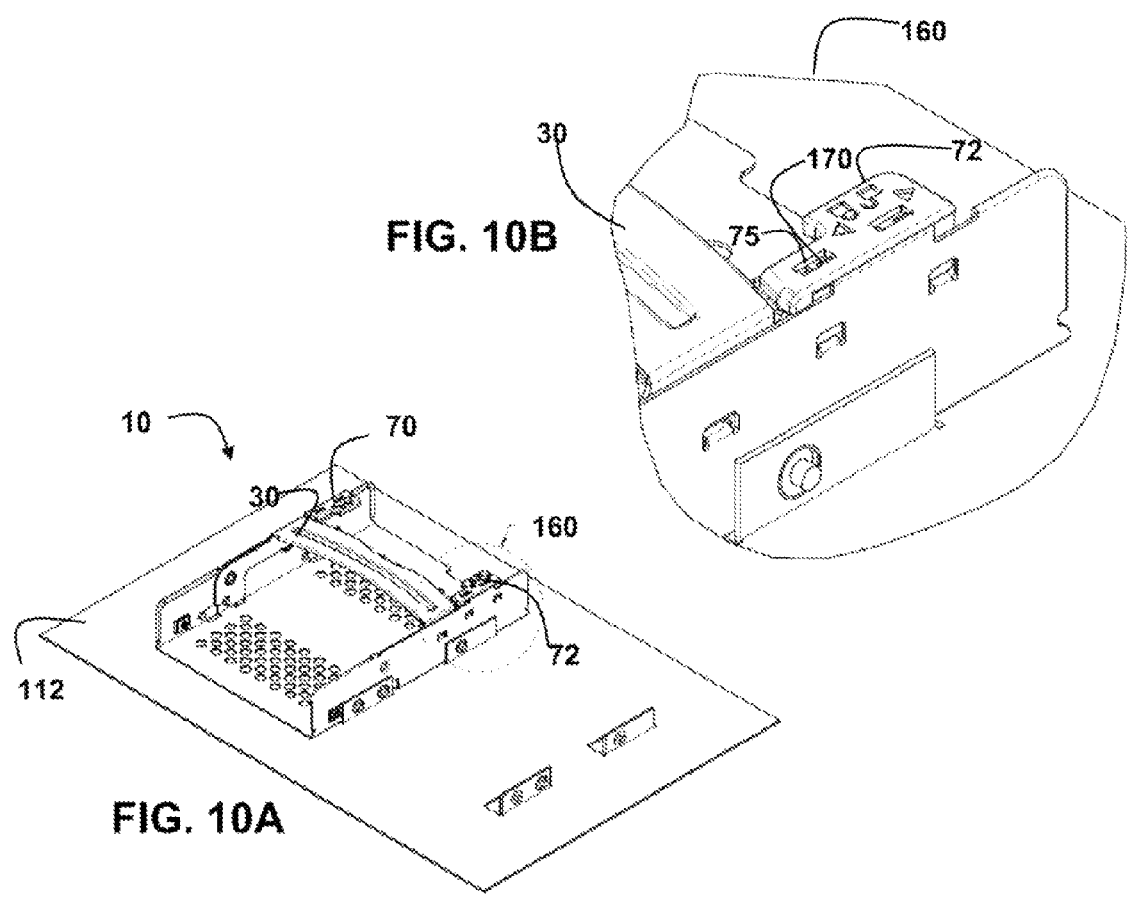
FIGS. 10A and 10B shows the positioning of the drive carrier in a computing system in a locked position in accordance with various embodiments.

FIGS. 10A and 10B are similar to FIGS. 9A and 9B but show the handle 30 in the locked position with the latches 70 and 72 slid toward the handle 30 to thereby engage the handle tip portions 170. Once the latches 70 and 72 engage the tips of the handle 30, the handle cannot be pivoted up. With the handle thus locked down, the pins from the stand-offs remain engaged in the stand-off receiving apertures of the carrier 10 and thus the carrier cannot be removed from the chassis. The latches 50, 70, 72 thus effectively lock the carrier 10 in place in the chassis. An accidental jar to the chassis 110 will reduce the possibility that the carrier 10 is dislodged from the surface 112 of the chassis.

Figure 11:
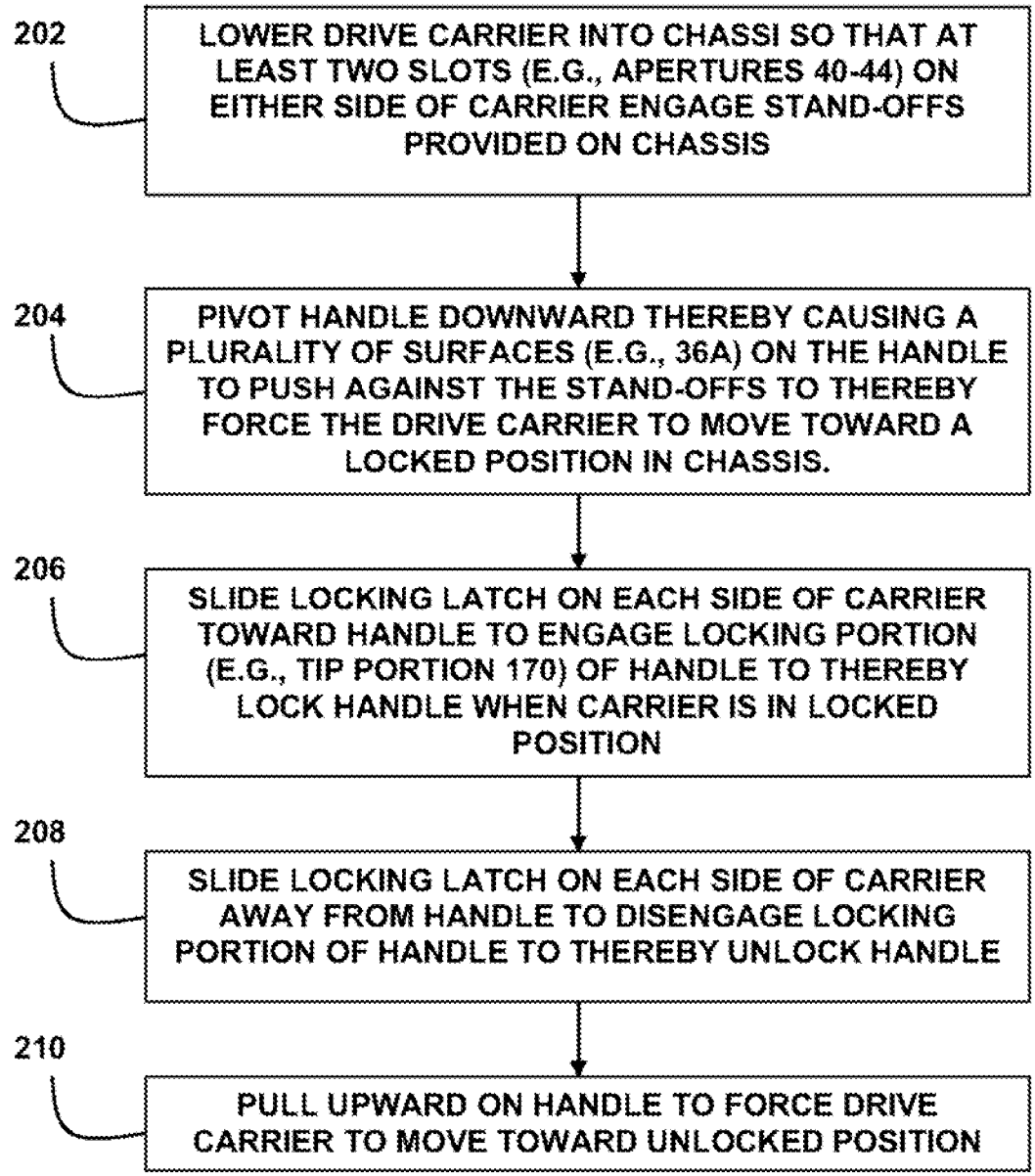
FIG. 11 provides a method in accordance with various embodiments.

FIG. 11 shows a method in accordance with various embodiments. At 202, a user lowers the drive carrier 10 (with storage drive) into a chassis so that at least two apertures (e.g., apertures 40-44) on either side of the carrier engage stand-offs provided in the chassis. At 204, the user pivots the handle 30 downward thereby causing a plurality of surfaces on the handle to push against the stand-offs to thereby force the drive carrier to move toward a locked position in the computer chassis. The plurality of surfaces which push against the stand-offs are opposite the hinge points 34, 35 from a portion of the handle that a user presses on (lateral member 31). At 206, the user slides a locking latch along each side of the carrier toward the handle to engage a locking portion of the handle (e.g., the tip portions 170) to thereby lock the handle when the drive is the locked position.

To remove the drive carrier, a user slides (208) the locking latches in the opposite direction (i.e., away from handle 30) to disengage the latches from the handle 30. At 210, the user pulls upward on the handle to force the drive carrier to move toward an unlocked position so that it can be removed from the chassis.

The above discussion is meant to be illustrative of the principles and various embodiments of the present invention. Numerous variations and modifications will become apparent to those skilled in the art once the above disclosure is fully appreciated. For example, while embodiments have been discussed with relation to power measurement and control, those skilled in the art will understand that embodiments are equally applicable to current measurement and control. It is intended that the following claims be interpreted to embrace all such variations and modifications.

What is claimed is:

1. A drive carrier comprising:
   a base adapted to receive a drive;
   two opposing sides extending from said base, each side having first and second stand-off receiving apertures that each receive a stand-off from a surface on which said drive carrier is to be positioned;
   a handle coupled to each side via a hinge, said handle having a stand-off receiving notch associated with each side, each stand-off receiving notch receives one of the stand-offs when the drive carrier is locked in place on said surface, each of said notches applies insertion and removal forces against the received stand-off during insertion and removal, respectively, of said drive carrier; and
   a locking latch selected from a structure consisting of (a) a pair of separate slidable locking latches, one slidable locking latch on a top edge of each of said sides and (b) a slidable member that extends between said top edges of said sides;
   wherein said hinges define a plane through said hinges and parallel to said base;
   wherein said handle pivots downward toward said plane and base to lock said drive carrier to said surface, and when said drive carrier is in a locked position, a lateral member of said handle rests above said plane;
   wherein said handle has a protruding lock extension on either side of said handle, each protruding lock extension engages in the locking latch provided on said sides to lock the handle and drive carrier in place on said surface.

2. The drive carrier of claim 1 wherein to unlock said drive carrier from said surface, said handle is pivoted upward away from said plane.

3. The drive carrier of claim 1 wherein said locking latch comprises a receiving portion that receives said protruding lock extension when said handle is locked.

4. The drive carrier of claim 1 wherein the locking latch comprises a flexible material that deforms as the handle is pivoted downward and returns to its original shape as the handle is locked in place.

5. The drive carrier of claim 1 wherein each side comprises a third stand-off receiving aperture positioned closer to one of the first or second stand-off receiving apertures than the other of the first or second stand-off receiving apertures.

6. A system, comprising:
   a computer chassis having a surface, said surface comprises a plurality of stand-offs;
   a top-loaded drive carrier comprising a handle, a base, and two opposing sides extending from said base, wherein said base receives a drive and wherein each side has first and second stand-off receiving apertures, and each stand-off receiving aperture receives a stand-off when said drive carrier is locked to said surface;
   wherein said handle is coupled to each side via a hinge, said handle having a stand-off receiving notch associated with each side, each stand-off receiving notch receives one of the stand-offs when the drive carrier is locked to said surface, and said handle has a protruding lock extension on either side of said handle each protruding lock extension engages in a locking latch that is selected from a structure consisting of (a) a pair of separate slidable locking latches, one slidable locking latch on a top edge of each of said sides and (b) a slidable member that extends between said top edges of said sides;

wherein said hinges define a plane through said hinges and parallel to said base; and wherein said handle pivots downward towards said plane and base to lock said drive carrier to said surface, and when said drive carrier is locked in place, said handle rests above said plane.

7. The system of claim 6 wherein to unlock said drive carrier from said surface, said handle is pivoted upward away from said plane.

8. The system of claim 6 wherein each side comprises a third stand-off receiving aperture positioned closer to one of the first or second stand-off receiving apertures than the other of the first or second stand-off receiving apertures.

9. A method, comprising:

lowering a drive carrier downward into a computer chassis so that at least two slots on either side of said drive carrier engage stand-offs provided in said computer chassis, said drive carrier comprising opposing sides;

pivoting a handle downward thereby causing a plurality of surfaces on the handle to push against said stand-offs to thereby force the drive carrier to move toward a locked position in said computer chassis, said plurality of surfaces being opposite hinge points from a portion of the handle that a user presses on; and locking the handle down by engaging a lock extension on the handle to a structure consisting of (a) a pair of separate slidable locking latches, one slidable locking latch on a top edge of each of said sides and (b) a slidable member that extends between said top edges of said sides.

10. The method of claim 9 further comprising pulling upward on said handle to force the drive carrier to move toward an unlocked position.

* * * * *

UNITED STATES PATENT AND TRADEMARK OFFICE
CERTIFICATE OF CORRECTION

PATENT NO. : 8,582,287 B2
APPLICATION NO. : 13/320736
DATED : November 12, 2013
INVENTOR(S) : Minh H. Nguyen et al.

It is certified that error appears in the above-identified patent and that said Letters Patent is hereby corrected as shown below:

In the Claims

In column 7, line 3, in Claim 6, delete "handle" and insert -- handle, --, therefor.

Signed and Sealed this
Fourth Day of March, 2014

Michelle K. Lee
*Deputy Director of the United States Patent and Trademark Office*